June 12, 1951 J. T. MITCHELL 2,556,433
ANTIGLARE EYE PROTECTIVE DEVICE
Filed Aug. 25, 1948
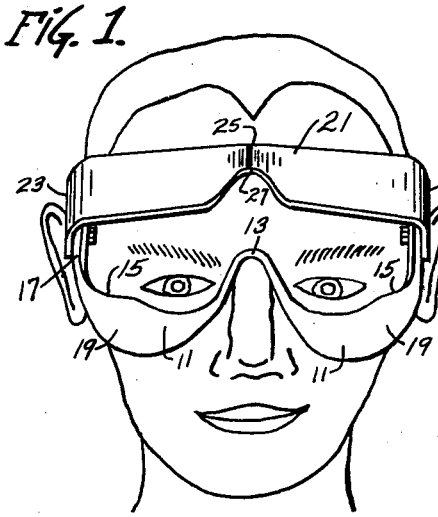
Fig. 1.
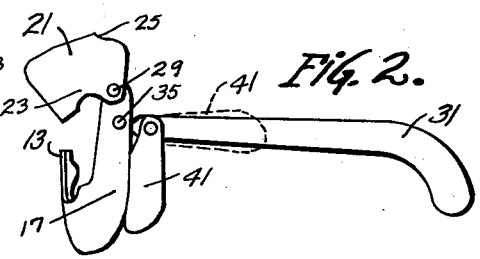
Fig. 2.
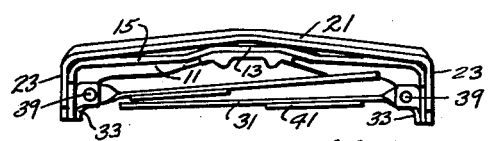
Fig. 3.
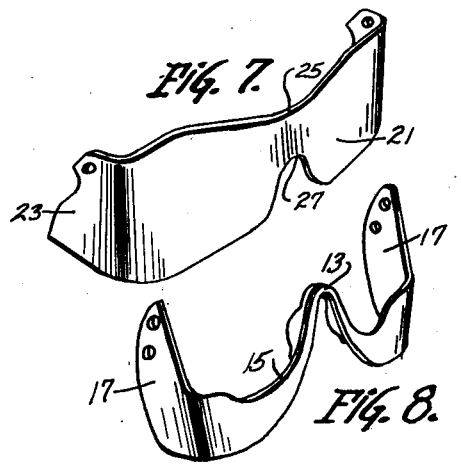
Fig. 7.
Fig. 8.
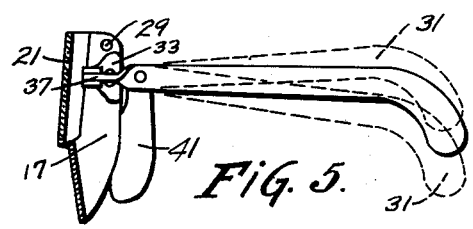
Fig. 5.
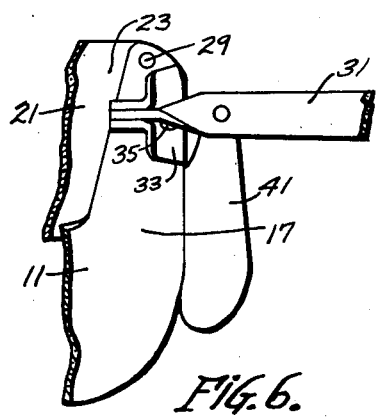
Fig. 6.
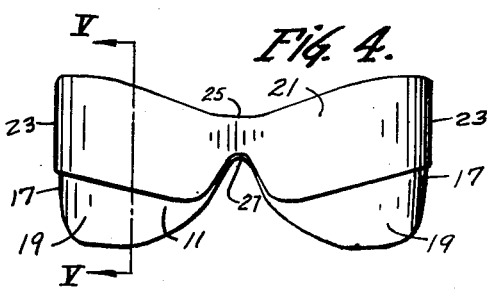
Fig. 4.
Inventor
JOHN T. MITCHELL
By Weatherford and Weatherford
Attorneys Patented June 12, 1951

2,556,433

UNITED STATES PATENT OFFICE 2,556,433

ANTIGLARE EYE PROTECTIVE DEVICE

John T. Mitchell, Memphis, Tenn.

Application August 25, 1948, Serial No. 46,041

5 Claims. (Cl. 2—14)

1

This invention relates to certain new and useful improvements in anti-glare protective devices for eyes, and may be particularly characterized as visor sun glasses.

It further relates specifically to improved means of attaching temple pieces to glasses, goggles, or similar objects.

Many attempts have been made to provide goggles, visors, sun glasses and the like for the protection of the eyes against glare as from the rays of the sun. These previous devices have, however, inherently failed to accomplish their prime purpose, particularly in a lack of flexibility of adjustment to fit the face contours of diverse wearers, and in failing to provide glare shielding elements at many of the critical points, particularly in the peripheral margin of the vision. These prior devices have further failed in that they have been limited to a single purpose, either acting as a visor or as a sun glass but not being adaptable for alternative use in either fashion as desired.

The principal object of the present invention is to provide a combination anti-glare device which will fully shield the vision periphery of the wearer, and which includes a visor-like member adapted in raised position to shade the eyes and in lowered position to shield the eyes from direct light rays.

A further object of the invention is to provide a new and novel means of attaching temple pieces to eye glasses, sun glasses, and the like.

A further object of the invention is to provide a combined visor and anti-glare device with new and novel anti-glare members; and A further object of the invention is to generally improve the design, efficiency, and construction of anti-glare devices for eye protection against light rays.

The means by which the foregoing and other objects of the invention are accomplished, and the manner of their accomplishment, will be readily understood from the following specification on reference to the accompanying drawings, in which:

Fig. 1 is a front view of the device of the present invention shown in simulated use position upon the face of a wearer.

Fig. 2 is a side elevational view of the device of the present invention.

Fig. 3 is a top plan view of the device with the temple pieces shown folded.

Fig. 4 is a front view of the device with the visor member in lowered position.

Fig. 5 is a sectional elevation taken on the line V—V of Fig. 4.

2

Fig. 6 is a fragmentary side view on an enlarged scale illustrating details of the arrangements of the parts.

Fig. 7 is a perspective view of the visor member of this invention; and

Fig. 8 is a perspective view of the combined shield and side members of the invention.

Referring now to the drawings in which the various parts are indicated by numerals:

The present invention includes a pair of antiglare shield members 11, which are preferably formed from transparent sheet-like thermoplastic material, such as acetate, which is tinted a desirable color to soften light rays. The shield members, at their inner ends, are connected by a bridge piece 13, the bridge piece being adapted to fit over the bridge of the nose of the wearer, and the shield members 11 are suspended below the bridge piece and extend oppositely therefrom as best illustrated in Fig. 1, so that when positioned upon the face of a wearer the shield members 11 lie below the eyes of the wearer. It will be seen that the upper edge 15 of each of the shield members is formed in a gently undulant pattern, the edges 15 at their inner ends merging into the bridge piece 13 and effecting a cut away adjacent the eye area so as to provide for free vision directly ahead while furnishing a protection against upwardly reflected light rays. It will be seen that the shield members 11 are relatively shallow.

At their respective outer ends, the shield members have side members 17 secured thereto, preferably integrally, the junction between the shield members and the side members being preferably in the form of curved portions 19. The side members 17 are disposed in a plane which intersects the plane of the shield members at an angle slightly less than 90° so that the side members rearwardly diverge to a minor extent from their respective points of connection with the curved portions 19. It will be seen that the side members 17 are upstanding, substantially vertically disposed members of substantially greater depth than the depth of the shield members 11 being shown in the present instance as in excess of twice the depth of the shield members and that the side members extend rearwardly and upwardly from their respective connections leaving the upper portions of the side members free, the connection between the side members and the curved portions 19 being effected in the lower portion of the side members.

When the device is positioned on the face of a wearer the side members 17 lie along the cheeks of the wearer adjacent the corners of the wearer's eyes, and extend rearwardly and upwardly therefrom so as to form a protection against light rays from the side and rear of the wearer's vision.

The device includes a visor member 21 which preferably is also formed from a transparent tinted thermoplastic material, such as acetate or the like, and includes side flanges 23 integral therewith and formed respectively at the opposite ends of the visor. The intermediate or face portion of the visor along its upper edge is provided with a centrally downwardly curved portion 25 adapted to fit against the forehead of a wearer, and along its lower edge is formed with a sharply upwardly curved portion 27 adapted to fit the bridge of the nose of a wearer. The visor is connected to the device by the pivots 29 through which the upper rear corner of each of the side flanges 23 is attached to the upper portions of the side members 17 adjacent the top of such portions. It will be seen that the visor member may be adjustably moved relative to the side members and shield members, and that when in the raised position, as illustrated in Figs. 1 and 2, the forehead portion 25 lies against the forehead of the wearer and the visor member effectively serves to shade the eyes of the wearer while permitting clear vision directly ahead. It will be seen that when in such position the side flanges 23 are positioned with their rearward edges substantially in transverse alinement with the forward edges of the side members 17 so as to provide the maximum shielding against peripheral light rays. It also will be noted that as shown in Fig. 4 when the visor member is fully lowered it is brought in front of the line of direct vision of the wearer's eye, the nose curve 27 engaging the nose of the wearer, and, by the mounting illustrated, the upper curved portion 25 reengages the forehead of the wearer, thus providing a device substantially completely shielding the eyes of the wearer from all undesired light rays. It is, of course, obvious that the visor member may be adjusted to any desired shading position intermediate the positions of Figs. 1 and 4. It will be seen that the side flanges 23 are spaced to overlap the upstanding side members 17 when the device is in the lowered position of Fig. 4 and that in any intermediate position the side flanges 23 cooperate with the side members 17 to effect the desired lateral shielding.

The temple pieces 31 are preferably employed with the device, although it will be understood that other means of securing the device to the head of the wearer such as a head band or the like may be employed. In their preferred form the temple pieces are mounted for both vertical and horizontal adjustment relative to the eye protective members. As illustrated, brackets 33 are respectively pivotally attached to the interior of the side members 17 by pivots 35 for movement in a vertical plane. It will be seen that these points of attachment are intermediate the length of the side members 17 and lie between the visor pivots 29 and the junction of the curved portions 19 with the side members 17. It will also be seen that through the medium of the present attachment, the brackets are adjustably vertically movable through a range of approximately 180°, thus assuring a practical range of adjustment to satisfy any use requirements. It will be seen that the bracket pivots 35 are disposed adjacent their respective rear edges of the brackets 33. Forwardly of the pivots 35, the brackets are each provided with a yoke portion 37 adapted to receive vertical hinge pins 39 by which the forward portions of the temple pieces 31 are hingedly attached to the brackets 33, so as to attach the temple pieces to the device. It will be noted that, as the temple pivots lie forwardly of the rear edges of the brackets 33 and the rear edges of the side members 17, the temple pieces may be folded inwardly for storage and lie completely between the side members 17 so as to leave no portions projecting rearwardly to unduly magnify the storage space required by the device. It will be seen that by the present mode of attachment the temple pieces are oscillatably adjustable vertically relative to the eye protective members, in addition to the hinged attachment for horizontal movement.

Preferably each of the temple pieces has a wing 41 pivotally attached thereto adjacent its forward end though spaced rearwardly therefrom and from the yokes so as to lie rearwardly of the rear edges of the side members 17 as shown in Fig. 5. When the temple pieces are vertically adjusted to fit the particular face contours of the wearer the wings 41 may be lowered into position and brought into edge abutment with the rear edges of the side members 17 effectively adding additional lateral glare protection. It will be seen that the horizontal movement of the temple pieces from storage position to use position is limited by the engagement between the forward portions of the temples and the interior of the side members, so as to effectively prevent undesired overtravel of the temple pieces, and insure proper edge abutment of the wings 41 with the side member 17.

It will be understood that while the material mentioned hereinabove for use in the manufacture of the present device has been described as transparent tinted acetate, many of the other thermoplastics are suitable for this use and may plainly be employed herein without departing from this invention. It will also be understood that while all of the parts have been described as being made of transparent material, certain of the parts may be made opaque or translucent in lieu of transparency without departing herefrom. Obviously, modifications in the precise size and shape of the parts may occur without departing from the spirit and scope of this invention except as limited by the appended claims.

I claim:

1. An anti-glare device which comprises a pair of shield members connected at their inner ends and extending laterally in substantial alinement and in opposite directions from their connection, a pair of vertically disposed side members integrally attached to said shield members at their respective outer ends and extending substantially at right angles to said shield members rearwardly and upwardly from their respective attachments to said shield members to provide lateral shielding portions having free upper portions positioned above and rearwardly of said outer ends of said shield members, said upper portions projecting above the level of the inner ends of said shield members, a visor member pivotally secured to said upper portions of said side members above the level of said inner ends, to adjustably attach said visor to said shield members, and means for engaging the head of a wearer of said device attached to said upper portions, below said visor pivots and above the level of said inner ends and said attachments of said shield members to said side members.

2. An anti-glare device which comprises a bridge member, a pair of shield members each attached at its inner end to said bridge member and extending laterally therefrom in substantial alinement and in opposite directions, said shield members lying below and outwardly from said bridge member, a pair of vertically disposed side members integrally attached to said shield members at their respective outer ends and extending substantially at right angles to said shield members rearwardly and upwardly from their respective attachments to said shield members to provide lateral shielding portions having free upper portions positioned above and rearwardly of said outer ends of said shield members and extending above the level of said bridge and said inner ends, a visor member having integral terminal flanges projecting rearwardly therefrom substantially at right angles thereto, said flanges being respectively pivotally secured to said upper portions of said side members above the level of said bridge and said inner ends to adjustably attach said visor to said shield members, a pair of temple pieces respectively hingedly connected to said upper portions adjacent said visor attachments and above the level of said inner ends and a pair of wings each pivotally attached at one end to a said temple piece for swinging movement from an upper portion in which said wings extend rearwardly from said pivotal attachments to said temple pieces with the opposite ends of said wings positioned rearwardly along said temple pieces, to a lowered position in which said wings extend downwardly from said temple pieces with said opposite ends projecting below said temple pieces and the forward edges of said wings abutting the rear edges of said side members.

3. An anti-glare device which comprises a pair of shield members connected at their inner ends and extending laterally in opposite directions, a pair of vertically disposed side members integrally attached to said shield members at their respective outer ends and extending rearwardly and upwardly from their respective attachments to said shield members to provide free upper portions positioned above and rearwardly of said outer ends of said shield members, a visor member having integral terminal flanges projecting rearwardly therefrom, said flanges being respectively pivotally secured to said upper portions of said side members to adjustably attach said visor to said shield members, a pair of brackets respectively pivotally attached to said upper portions between said flange pivots and said attachments of said shield members to said side members, for vertical oscillation of said brackets relative to said side members, said brackets each including a yoke positioned forwardly of the attachments of said brackets to said upper portions, and a pair of rearwardly extending temple pieces respectively hinged to said yokes for horizontal folding and unfolding.

4. An anti-glare device which comprises a pair of shield members connected at their inner ends and extending laterally in oppostie directions from their connection, a pair of vertically disposed side members integrally attached to said shield members at their respective outer ends and extending rearwardly and upwardly from their respective attachments to said shield members to provide free upper portions positioned above and rearwardly of said outer ends of said shield members, a visor member pivotally secured to said upper portions of said side members, a pair of brackets respectively pivotally attached to said upper portions between said visor pivots and said attachment of said shield members to said side members, for vertical oscillation of said brackets relative to said side members, said brackets each including a yoke positioned forwardly of the attachments of said brackets to said upper portions, and a pair of temple pieces respectively hinged to said yokes.

5. An anti-glare device which comprises a bridge member, a pair of shield members each attached at its inner end to said bridge member and extending laterally therefrom in opposite directions, said shield members lying below and outwardly from said bridge member, a pair of vertically disposed side members integrally attached to said shield members at their respective outer ends and extending rearwardly and upwardly from their respective attachment to said shield members to provide free upper portions positioned above and rearwardly of said outer ends of said shield members, a visor member having integral terminal flanges projecting rearwardly therefrom, said flanges being respectively pivotally secured to said upper portions of said side members to adjustably attach said visor to said shield members, a pair of brackets respectively pivotally attached to said upper portions, between said flange pivots and said attachments of said shield members to said side members, for vertical oscillation of said brackets relative to said side members, said brackets each including a yoke positioned forwardly of the attachments of said brackets to said upper portions, a pair of temple pieces respectively hinged to said yokes, and a pair of wings pivotally attached to said temple pieces adjacent but spaced rearwardly from said yokes and adapted to abut the rear edges of said side members.

JOHN T. MITCHELL.

REFERENCES CITED

The following references are of record in the file of this patent:

UNITED STATES PATENTS

| Number | Name | Date |
| --- | --- | --- |
| 230,556 | Lancaster | July 27, 1880 |
| 542,389 | Lind | July 9, 1895 |
| 1,884,047 | McClellan | Oct. 25, 1932 |
| 2,107,103 | Catron, Jr. | Feb. 1, 1938 |
| 2,224,784 | Goldschmid et al. | Dec. 10, 1940 |
| 2,256,966 | Simonton | Sept. 23, 1941 |